Aug. 15, 1967  TOKUTARO TSUJIOKA  3,335,572
MODULAR PANELS FOR THE CONSTRUCTION OF WATER BLOCKADES
Filed Feb. 25, 1965  4 Sheets-Sheet 2
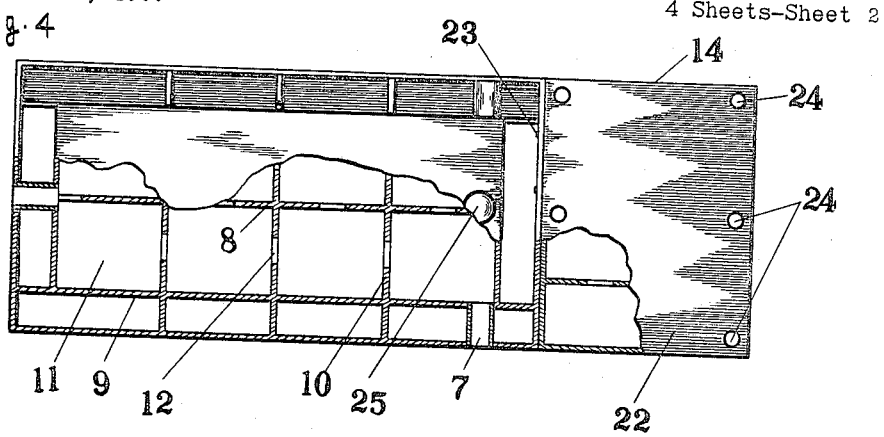
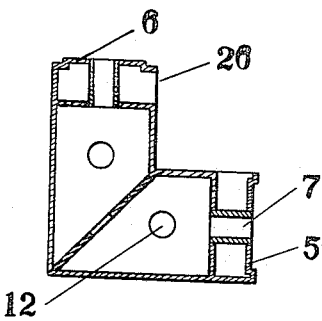
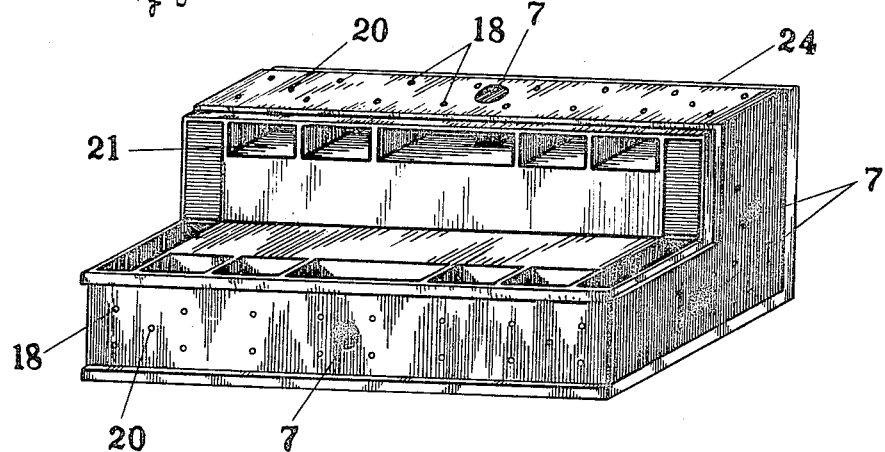
Tokutaro Tsujioka
INVENTOR.
BY Wenderoth, Lind
and Ponack,
Attorneys Aug. 15, 1967     TOKUTARO TSUJIOKA     3,335,572
MODULAR PANELS FOR THE CONSTRUCTION OF WATER BLOCKADES
Filed Feb. 25, 1965                      4 Sheets-Sheet 4
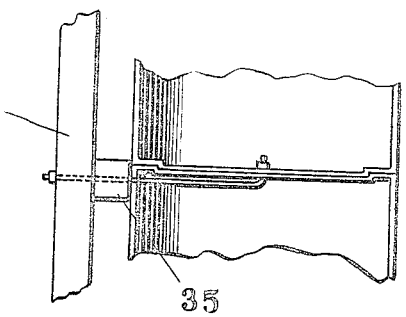
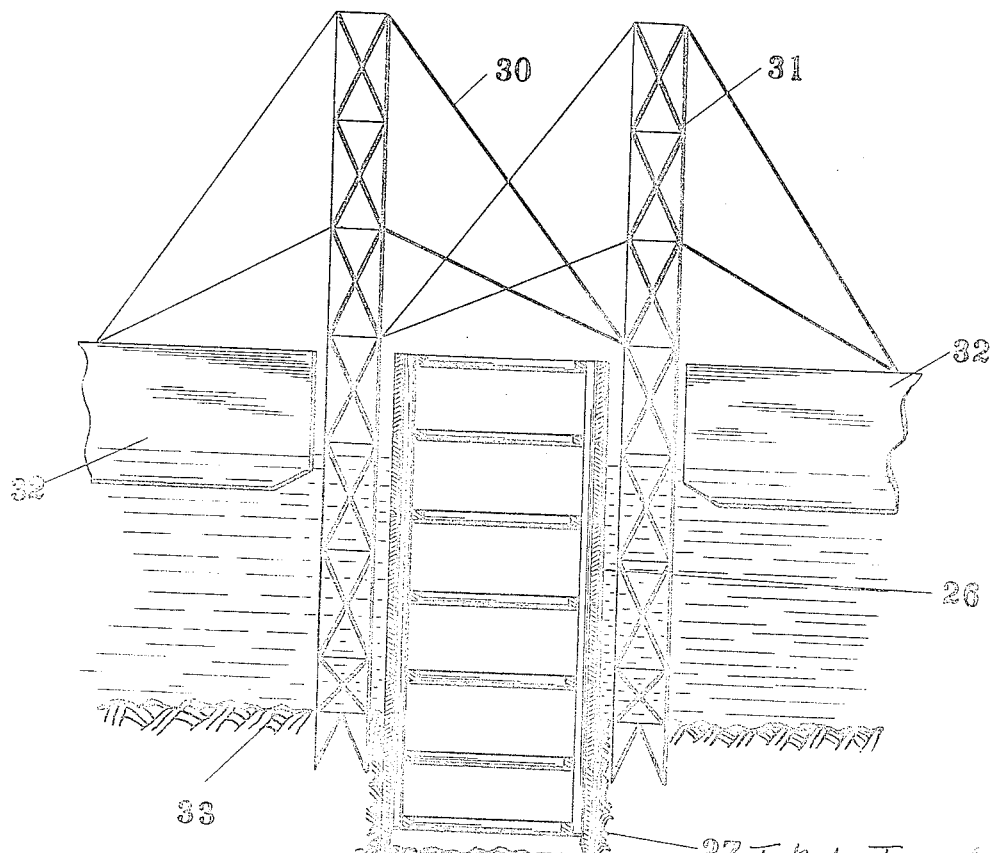
INVENTOR.

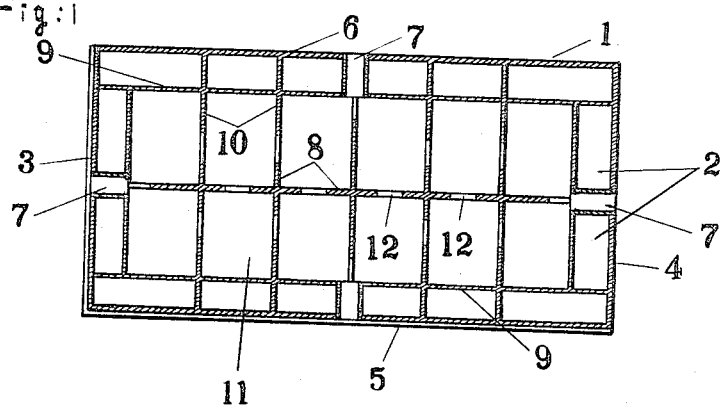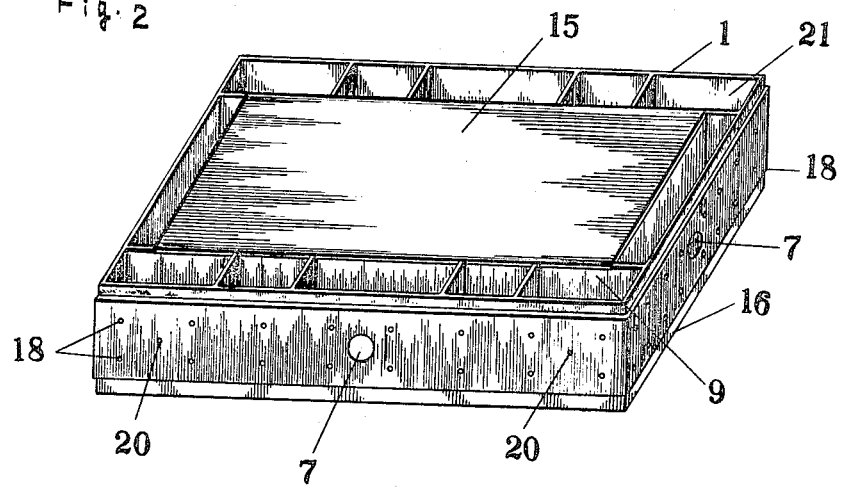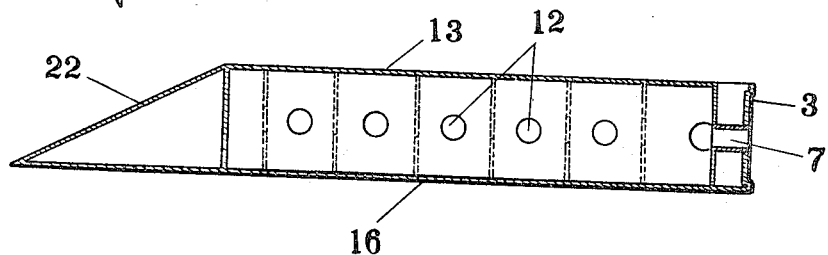

3,335,572
MODULAR PANELS FOR THE CONSTRUCTION OF
WATER BLOCKADES
Tokutaro Tsujioka, 1–14 Kitasakoniban-cho,
Tokushima, Japan
Filed Feb. 25, 1965, Ser. No. 435,265
5 Claims. (Cl. 61—34)

ABSTRACT OF THE DISCLOSURE

An assembly of panels for use in forming an underwater wall or other structure, particularly for blocking the flow of water, each panel having a closed partitioned space between parallel flat walls, the partitions being apertured to provide communication throughout the closed space. Outer peripheral walls depend from the projecting edges of one of the flat walls and a plurality of pockets are formed around the closed space. Conduits extend into the closed spaced to provide communication between it and the space outside of the panels. The panels are assembled with the outer peripheral walls in abutting and mating relationship with the conduits aligned to provide communication between the closed spaces in adjacent panels. Connecting means in the form of bolts and nuts or the like bolt the adjacent panels to each other, and these nuts and bolts are accessible by means of the pockets.

---

This invention relates to modular panels for the construction of water blockades, and, more particularly, to modular panels adapted to form a rectangular blockade, comprising corner panels adapted to form the corners of said rectangle and intermediate panels which are to form the lateral sides of said rectangle, both of said panels consisting, respectively, of a plurality of water-blocking walls, and a plurality of inner chambers defined by said walls and communicable with each other through water-passageways bored or formed in said walls, the chambers within each panel communicating with the chambers within the adjacent panels through the water-ways bored or formed in the contact sides of said panels so that the rectangular blockade built up of said panels as a whole may be readily floated or sunken in the water.

The object of this invention is to provide modular panels which may help facilitate the blocking or damming of water at construction sites, e.g. for the construction of bridges and other structures in quick waters.

Another object is to provide modular panels which may be easily transported to the site for assembly there or which may be preliminarily assembled and towed to the side by way of rivers and other waterways.

Conventionally, where the water is shallow, the blocking of water is usually effected with sheet piles, for instance, but where the water is deep or the stream is rapid, such a method proves quite difficult to carry into practice, involving inconveniences in the transportation and assembling of the materials.

These disadvantages and inconveniences are completely eliminated by this invention. This invention will hereinafter be described in detail, reference being had to the accompanying drawings, in which:

FIG. 1 is a transverse sectional view of the intermediate panel of this invention;

FIG. 2 is a perspective view of the same intermediate panel as shown in FIG. 1;

FIG. 3 is a longitudinal cross-sectional view of a modified form of the intermediate panel, which is provided with a tapered end;

FIG. 4 is a partial cross-sectional view of the modified intermediate panel provided with a tapered end;

FIG. 5 is a longitudinal cross-sectional view of the corner panel of this invention;

FIG. 6 is a perspective view of the corner panel of FIG. 5;

FIG. 10 is a view illustrating the manner in which the panels of this invention are connected with the aid of reinforcing bars; and FIG. 11 is a longitudinal cross-sectional view showing the manner in which the panels of this invention are connected.

Figure 7:
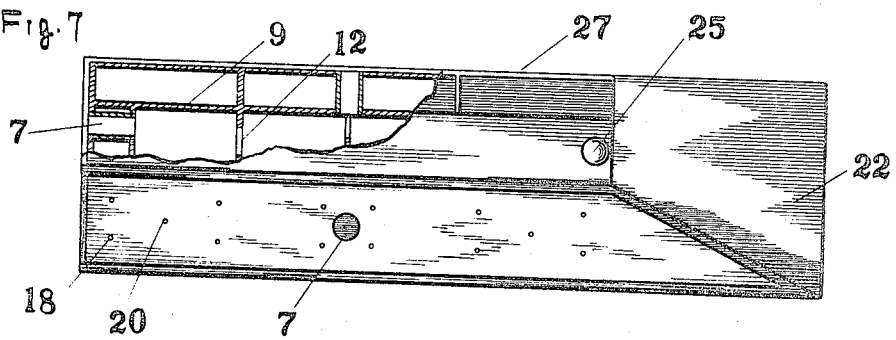
FIG. 7 is a partial cross-sectional view of a modified form of corner panel having a tapered end.
Figure 8:
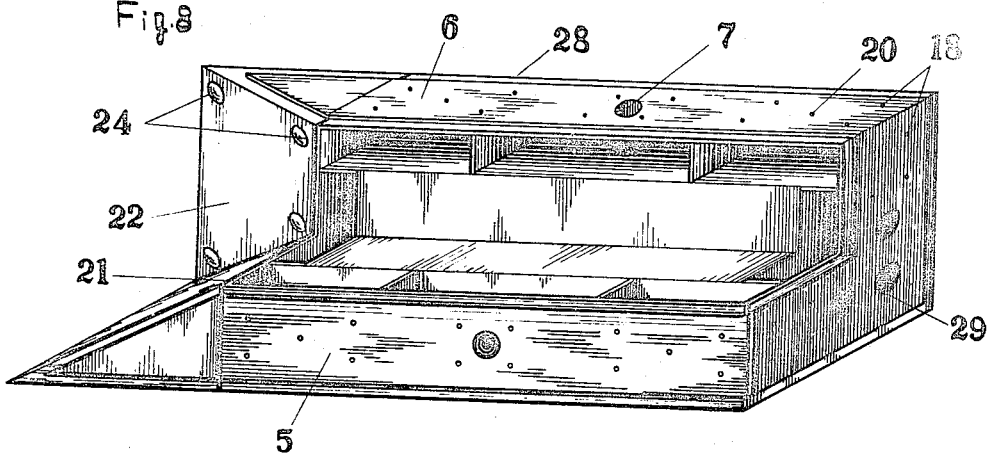
FIG. 8 is a perspective view of the modified corner panel shown in FIG. 7.

Referring to FIGS. 1 through 8, an intermediate panel had an enclosed space 2 defined by a depressed top contact wall 3, a raised bottom contact wall 4, a depressed lateral contact wall 5, and a raised lateral contact wall 6. A central water-passageway 7 is provided through said walls 3, 4, 5, and 6, respectively. The space 2 is divided into chambers 11 by a central blocking wall 8, longitudinal walls 9 which are connected to the top and bottom contact walls, and transverse walls 10 which are connected to the lateral contact walls. The above-mentioned chambers 11 are interconnected by waterways 12 which are provided in said blocking walls. In the drawings, indicated with numeral 15 is the inside wall of said intermediate panel 1, 16 is the outside wall of same panel, 18 are bolt holes, 20 are holes through which a reinforcing bar may be bolted, and 21 are open spaces. Just like the panel 1, an intermediate panel having a tapered end 13 has a enclosed space 2, but it is different from the panel 1 in that it is provided with a tapered end shaped like a triangle in cross-section in the center and near the lower edge. A corner panel 26 also has an enclosed space 2 which is similar to the space 2 of the intermediate panel 1, except that the cross-section of the former space is shaped like L. A corner panel 27 which is provided with a tapered end has an enclosed space 2 similar to that of said corner panel 26 and differs from the latter panel in that a tapered end 22 is integrally formed with the bottom contact wall 4. A modified corner panel 28, which is also provided with a projecting end, has an enclosed space 2 which is similar to the space of the corner panel 27 but differs from the latter in that it has water-passageways 29, extending from the top contact wall 3 to the bottom contact wall 4.

Figure 9:
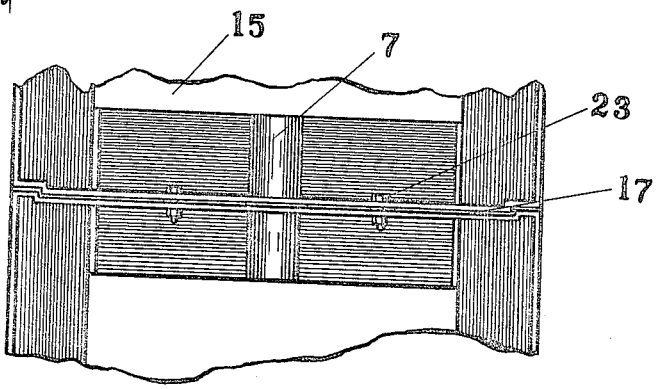
FIG. 9 is a schematic view showing the manner in which the panels of this invention are connected.

Referring to FIGS. 9 through 11, which, respectively, show the arrangement of the panels of this invention, the corner panels 26 are arranged at the corner of the two adjoining sides which are built up of the intermediate panels, and the intermediate and corner panels having tapered ends are arranged at the bottom of the structure. In this arrangement, the waterways in the contact walls of the panels are intercommunicated so that the structure as a whole may be freely raised afloat or sunken. Indicated with numeral 17 is a packing, 18 are bolts, and 30 are supporting wires, 31 are skelton structures, 32 are floating piers, 33 is the bottom of the sea or river, 34 are horizontal reinforcing bars, and 35 are vertical reinforcing bars. These reinforcing bars are used to reinforce the connection of the panels in deep water. It is to be understood that the arrangement or combination of the panels may be changed as desired according to the type and nature of the construction project involved. The structure of each type of the panel of this invention having been thus described, it is now apparent that the enclosed space within each panel greatly facilitates the erection of a water blockade even in a rapid stream or deep water and that the sharp edge of the tapered end described above anchors the whole structure securely in the sea or river bottom. Moreover, since the tapered end 22 may be freely attached to the bottom contact wall 4 or be detached therefrom through bolts 23, the same panel may be used at the lower edge of the structure when the tapered end is attached, and may be used in an intermediate position or at the top edge of the structure when the tapered end has been detached from it. Thus, this particular type of panel has a wide range of application. As described hereinbefore, each panel has raised and depressed contact walls so that the raised contact wall of one panel may be securely fitted into the depressed contact wall of another panel. In this way, when these panels are connected with each other by means of bolts and nuts, the contact bettween the two adjoining panels is greatly enhanced so that the panels are not disconnected when subjected to hydraulic and other pressures. As an added protection, horizontal reinforcing bars 34 and vertical reinforcing bars 35 are employed to brace the panels securely through bolts and nuts. In this manner, the block structure of these panels proves of considerable benefit in any water-blocking project in deep water of rapid streams. Furthermore, since each panel has open spaces 21, the panels may be easily connected together by the utilization of bolts and nuts. When the panels are connected together in such a manner that their water-passageways coincide with each other, and where the panels have water inlet-outlets 29 as well as said passageways, the water admitted through said inlet-outlets 29 fills the chambers 11 through the water channels 12 and finds its way further into the adjacent panel through the corresponding water-passageways and fills the chambers within said panel. In this manner, all the panels are rapidly filled with water. In draining the panels, the water may also be rapidly withdrawn by a pump through the above-mentioned water inlet-outlets.

It will be apparent from the foregoing description that the panels of this invention may be easily connected with each other to form a rectangular blockade of the desired dimensions and the blockade so formed may be floated or sunken as desired. Furthermore, the panels of this invention are standardized so that they may be fabricated easily on a mass-production scale and transported and assembled easily at the construction site.

What I claim is:

1. An assembly of panels for blocking the flow of water in an underwater construction, each panel comprising an outer wall and an inner wall spaced therefrom, transverse peripheral walls around the periphery of the inner wall and joined to the inner and outer wall to define a closed space between said walls, apertured partitions between the walls within said closed space, the outer wall extending beyond the inner wall, outer peripheral walls depending from the edges of said outer wall on the same side thereof as said inner wall, a pluarilty of pockets forming partitions between the transverse peripheral walls and the outer peripheral walls and defining pockets between the transverse peripheral walls and the outer peripheral walls which open away from the outer wall, and conduits between the outer peripheral walls and transverse peripheral walls and opening through each of said walls to provide communication between the closed space and the space outside said outer peripheral walls, said panels being assembled with the outer peripheral walls in abutting and mating relationship with the openings of the conduits aligned to provide communication between the closed spaces in adjacent panels, and connecting means extending through the outer peripheral walls of adjacent panels holding them in abutting relationship, said connecting means extending into the pockets in the panel and being accessible therein.

2. An assembly as claimed in claim 1 in which said connecting means are bolts and nuts.

3. An assembly as claimed in claim 1 in which said outer peripheral walls of adjacent panels have mating projections and depressions.

4. An assembly as claimed in claim 1 in which said panels include substantially flat plane panels and corner panels in which the outer and inner walls are bent at right angles.

5. An assembly as claimed in claim 1 in which at least some of the panels at the lower part of the assembly have pointed projections projecting downwardly from the outer peripheral walls.

References Cited

UNITED STATES PATENTS

| | | | |
|---|---|---|---|
| 851,532 | 4/1907 | Le Fevre | 61—34 |
| 924,362 | 6/1909 | Leow | 61—34 |
| 1,255,702 | 2/1918 | Brown | 61—46 |
| 1,310,461 | 7/1919 | Williams | 61—46 |
| 2,014,116 | 9/1935 | Powers | 61—4 |
| 2,364,570 | 12/1944 | Tumolillo | 61—64 |
| 2,596,788 | 5/1952 | Perkins | 61—82 |
| 2,966,778 | 1/1961 | Quirin | 61—46 |

FOREIGN PATENTS

| | | |
|---|---|---|
| 25,970 | 1901 | Great Britain. |

EARL J. WITMER, *Primary Examiner.*